US010956873B2

(12) United States Patent
Maselli

(10) Patent No.: US 10,956,873 B2
(45) Date of Patent: Mar. 23, 2021

(54) METHOD AND SYSTEM FOR USING MOBILE PHONE NUMBERS TO UNIQUELY IDENTIFY MAIL RECIPIENTS AND PREFERRED MEDIUM FOR DELIVERY

(71) Applicant: BELL AND HOWELL, LLC, Durham, NC (US)

(72) Inventor: Michael Maselli, Cary, NC (US)

(73) Assignee: BELL AND HOWELL, LLC, Durham, NC (US)

(*) Notice: Subject to any disclaimer, the term of this patent is extended or adjusted under 35 U.S.C. 154(b) by 978 days.

(21) Appl. No.: 14/291,132

(22) Filed: May 30, 2014

(65) Prior Publication Data

US 2014/0358950 A1 Dec. 4, 2014

Related U.S. Application Data

(60) Provisional application No. 61/829,823, filed on May 31, 2013.

(51) Int. Cl.
*G06F 15/16* (2006.01)
*G06Q 10/10* (2012.01)

(52) U.S. Cl.
CPC .................. *G06Q 10/107* (2013.01)

(58) Field of Classification Search
CPC ......... G06F 17/30569; G06F 17/30067; G06F 17/30286
USPC ........................................................ 707/756
See application file for complete search history.

(56) References Cited

U.S. PATENT DOCUMENTS

| 6,157,924 | A | 12/2000 | Austin |
| 6,701,315 | B1* | 3/2004 | Austin .................. H04L 67/306 |
| 7,430,554 | B1* | 9/2008 | Heisinger, Jr. ......... G06Q 30/02 |
| 2006/0136561 | A1* | 6/2006 | Lee ..................... H04L 29/1215 709/206 |
| 2008/0162637 | A1* | 7/2008 | Adamczyk .......... H04L 12/5815 709/204 |
| 2008/0172306 | A1* | 7/2008 | Schorr .................. G06Q 30/02 705/26.41 |
| 2009/0024473 | A1 | 1/2009 | Friedman |
| 2009/0024474 | A1 | 1/2009 | Friedman |
| 2010/0041368 | A1* | 2/2010 | Kumar .................. G06Q 20/02 455/407 |
| 2011/0246284 | A1* | 10/2011 | Chaikin ............... G06Q 20/105 705/14.38 |
| 2013/0179244 | A1* | 7/2013 | Laffoon .............. H04L 63/0823 705/14.23 |
| 2014/0143354 | A1* | 5/2014 | Tiernan .................. H04L 51/32 709/206 |

(Continued)

FOREIGN PATENT DOCUMENTS

WO 2012162306 A2 11/2012

*Primary Examiner* — Alex Gofman
(74) *Attorney, Agent, or Firm* — Jenkins, Wilson, Taylor & Hunt, P.A.

(57) ABSTRACT

The present subject matter relates to techniques and equipment for creating and managing a directory of individuals and businesses/enterprises by their mobile phone number, and using the directory to effectively store, manage and direct mail communication information to the individuals and businesses using preferred delivery methods of the individuals and businesses/enterprises. An electronic communication system is configured to use a mobile phone number to reference data and to manage communications to a corresponding recipient.

22 Claims, 5 Drawing Sheets

(56) References Cited

U.S. PATENT DOCUMENTS

2014/0278940 A1\* 9/2014 Wade ................. G06Q 30/0264
705/14.45

\* cited by examiner

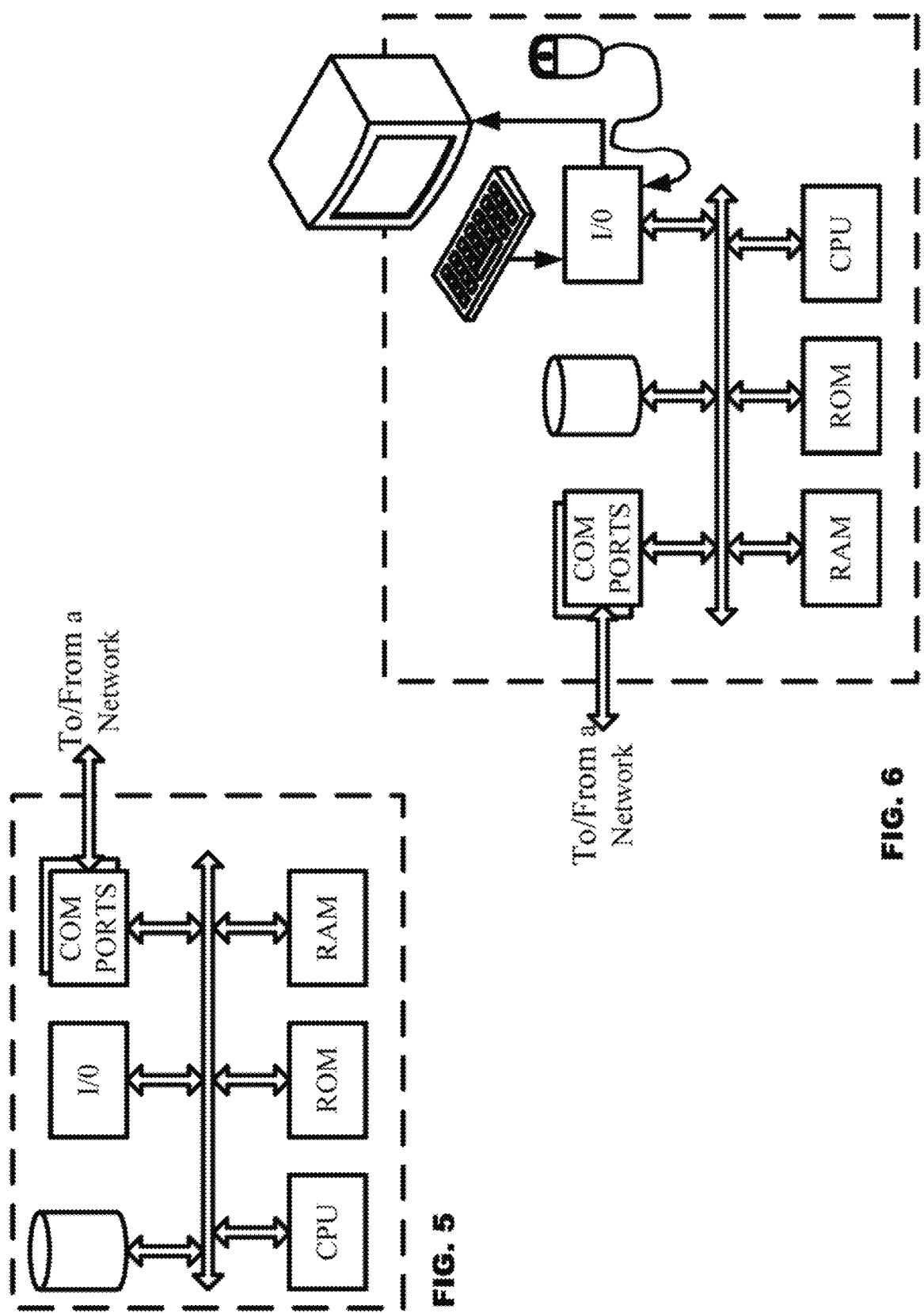

METHOD AND SYSTEM FOR USING MOBILE PHONE NUMBERS TO UNIQUELY IDENTIFY MAIL RECIPIENTS AND PREFERRED MEDIUM FOR DELIVERY

RELATED APPLICATION

This application claims the benefit of U.S. Provisional Application No. 61/829,823 filed on May 31, 2013 which is entirely incorporated herein by reference.

TECHNICAL FIELD

The present subject matter relates to techniques and equipment for creating and managing a directory of individuals and businesses/enterprises by their mobile phone number, and using that directory to effectively store, manage and direct mail communication information to the individuals and businesses using preferred delivery method(s) of the individuals and businesses/enterprises.

BACKGROUND

Existing electronic communication delivery systems have a data structure that is based around a physical address (e.g., building residence, etc.) or a collection of enterprise account numbers to identify customers. In the digital age, physical addresses to identify a customer are a throwback to physical mail delivered by the postal authority. Clearly, there must be a physical location if mail is going to be delivered. However, using a physical address to reference a customer in an electronic communication system is defective. For example, there can be more than one person at an address, requiring additional identification parameters. A customer may have multiple addresses such as a home, vacation home, and work. Which address to use for communications is not clear since different communications may only be sent to specific addresses. The address based data structure requires frequent updates to stay current with the customer's movements. Building a communication database or file structure, by linking all of the account numbers for the selected enterprises that the customer does business with, does not cure the problems encountered with physical addresses.

Smart phones and tablets, both may have mobile phone numbers assigned, are quickly overtaking personal computers and laptops as a consumer's preferred method of accessing the internet and communicating with friends and businesses. The vast majority of the population has a mobile phone number, from a cell phone or from a tablet, all of which are unique and in the vast majority of cases the mobile phone is associated with a single person. A system that creates and manages a communications database using a directory of individuals and businesses referenced by their cell phone number, and uses those directories to store, manage and direct information to the customers using their preferred delivery method of communications, provides the data structure and a customer reference that is unique and is not tied down to a physical address or a collection of account numbers. Other mobile devices, as they evolve, will have a unique mobile phone number that can be used as a reference number in the data structure.

Hence a need exists for an electronic communication system that uses a mobile phone number to reference data and to manage communications.

SUMMARY

In one aspect of the present application there is provided a method for electronically recording data of a recipient by an information delivery service to format and deliver communications to the recipient. The method includes receiving and storing recipient data in a database by way of a programmed computer. The recipient data is electronically enrolled into a database of the information delivery service database. A recipient selection of enterprises authorized to send the communications to the recipient is received. Preferred delivery channels are identified for delivery of the communications. The recipient data is associated with a mobile phone number of the recipient, such that the mobile phone number permits access of the recipient data within the database.

In another aspect of the present application there is provided a method of transmitting one or more communications from an enterprise to at least one recipient by way of an information delivery service. The method includes receiving a communication request from the enterprise at an information delivery service communication manager computer and storing communication content and instructions in a database referenced to a mobile phone number of the recipient. Delivery preferences are identified for each type of communication content as specified by the recipient, and referenced by the mobile phone number. Communication content is formatted based on the identified delivery preferences and requirements of one or more communication delivery channels. Connectivity to the one or more delivery channels that are required for each pending communication to the recipient is established. Each communication is transmitted to the associated delivery channel.

In yet another aspect of the present application, there is provided a method of executing a marketing communication by an enterprise to target a plurality of recipients through delivery channels. The method comprises developing a list of the recipients by the enterprise, and associating demographic data with each recipient to establish a marketing communications plan. The recipient list and demographics data are sent to an information delivery service. Enterprise communication requirement data is received and the data is stored in at least one database of the information delivery service. The recipient list is associated with respective mobile phone numbers of each recipient to reference entries in the database. The communications are transmitted to the respective recipients by way of the delivery channels.

There is further provided an electronic communication system for transmitting one or more communications from an enterprise to at least one recipient by way of an information delivery service. The system comprises an information delivery service communication manager computer that is configured to receive a communication request from the enterprise and storing communication content and instructions in a database and referenced to a mobile phone number of the recipient. A delivery preference database is configured to store delivery preferences for each type of communication content as specified by the recipient, referenced by the mobile phone number. A communication server is configured to format communication content based on the delivery preferences and requirements of one or more communication delivery channels; establish connectivity to the one or more delivery channels that are required for each pending communication to the recipient; and transmit each communication to the associated delivery channel.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 illustrates a network or host computer platform, as may typically be used to implement a server.

FIG. 6 depicts a computer with user interface elements, as may be used to implement a personal computer or other type of work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details or restrictions exhibited in examples that are provided. In other instances, well known methods, procedures, components, and network communications have been described at a relatively high-level, without detail, in order to avoid unnecessarily obscuring aspects of the present teachings.

The present application relates to creating and managing a directory of individuals and businesses/enterprises by their mobile phone number by way of an information delivery service, and using that directory for storing, managing and directing mail communication information to the individuals and businesses using their preferred delivery method. The delivery method includes one or more delivery channels, non-limiting examples including a mobile, app, email, physical mail, fax, SMS text, social media IDs, cable television account, etc.

The communication industry is quickly realizing that to satisfy the needs of their customers they must be able to deliver information when and where end-users want. The majority of people still prefer to receive mail via postal delivery, but the number of people requesting electronic delivery is growing quickly. Electronic delivery comes in many forms, and includes presentment at a web site, at a document consolidator service site, mobile app, email, SMS text, and could be delivered by many other digital channels including television channels, social media sites, or the like. The communications may be mail which can be a bill, a statement, a document, a notification, a solicitation for goods or services, a personal letter, a short message, or any other communication between two parties.

Figure 1:
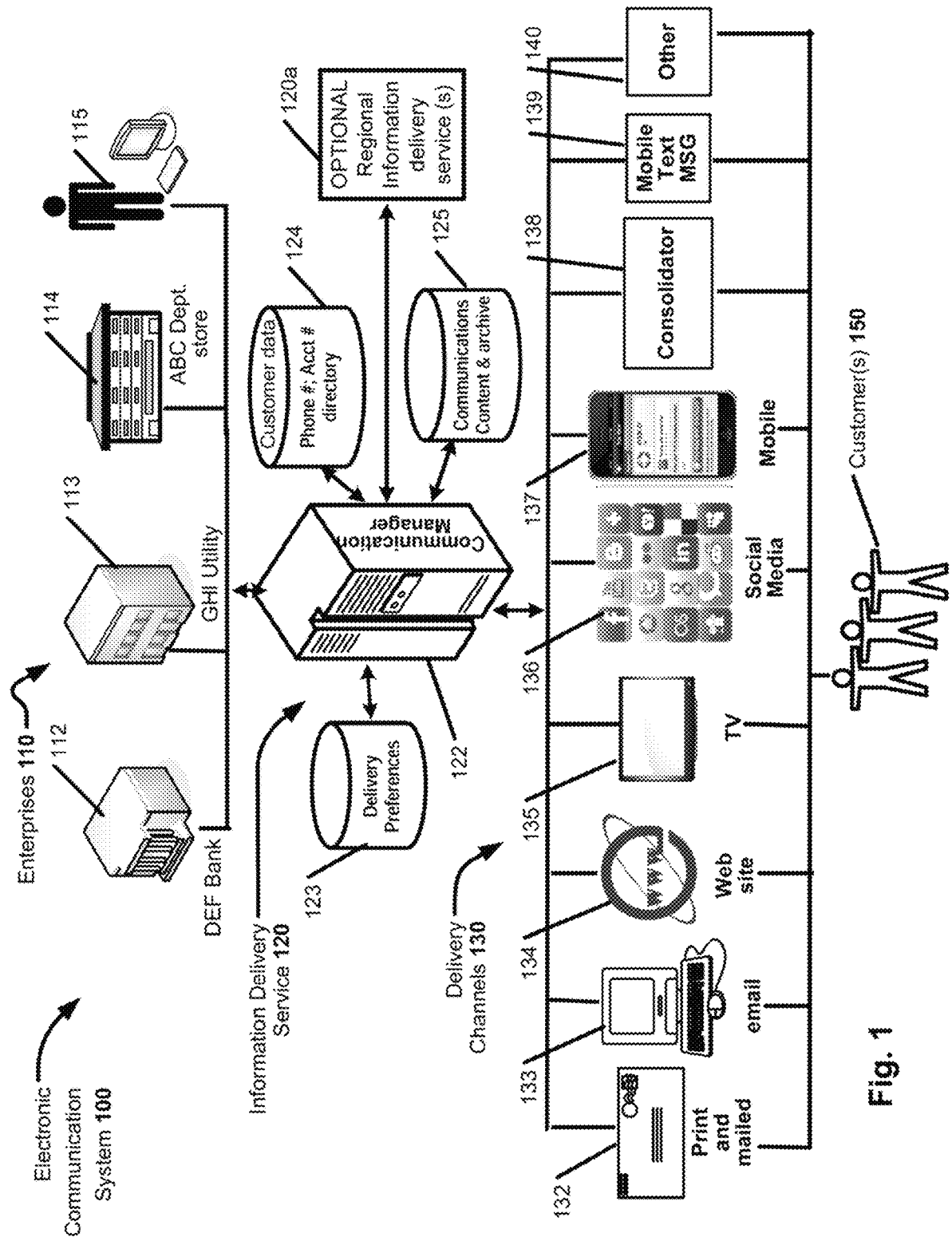
FIG. 1 is an exemplary diagram of the major features of an electronic communication system.

Turning to FIG. 1, the information delivery service 120 allows one or multiple delivery channels (mobile, app, email, physical mail, fax, SMS text, social media IDs, cable television account, etc.) to be used. The information delivery service 120 will be able to segment, format and/or distribute through some or all of these channels, and optionally provide the enterprise that initiated the communication with activity tracking such as date and time of received communication, date and time the communication was accessed, in addition to other information that was accessed through links or phone numbers, etc. Regardless of the method and channel of communication, each recipient will be 'uniquely known' by a mobile phone number.

The information delivery service 120 will serve as the central data manager and dispatcher of incoming information using each recipient's mobile number to identify them and their user settings. The central repository of accounts will use public and private methods to enable message originators to send information with or without a link (secure or unsecure) to more information. The system can be the router and manager of all data, or just be an information source that other systems will query for information related to how customer data should be delivered. The one or more supporting data directories can be used to store one delivery preference per user, or be setup to support multiple options. Some companies may want to send summary information to a mobile app and send full documents via postal delivery to customer's house. Alternately, a mailer may want to allow different types of mail to be sent via different channels, such as email for marketing materials and print for bills.

Reference now is made in detail to the examples illustrated in the accompanying drawings and discussed below. FIG. 1 is an exemplary diagram of the components of an electronic communication system 100. The objective of the electronic communication system 100 is to enable enterprises 110 such as, but not limited to, businesses, churches, medical establishments, financial institutions, charities, utilities and retail sales, all of which are referred to as enterprises in this disclosure, communicate with customers/recipients 150.

An information delivery service 120 enables the enterprises 110 to communicate with customers 150 over diverse delivery channels 130 in a variety of formats to include but not limited to audio, electronic display and print. The exemplary illustration of the delivery channels 130 shows several examples 132 through 139. However, in the rapidly evolving digital communications field, may other channels 140 will be developed which will result in updates to the connectivity and communications data formats that the information delivery service 120 supports in order to make the new/other communications delivery channel 140 available to information delivery service 120, customers 150 and enterprises 110.

FIG. 1 depicts three exemplary enterprises, DEF Bank 112, GHI utility 113 and ABC Department store 114. Each of these enterprises will communicate information to the information delivery service 120 which is needed to generate communications to the customers 150. An information delivery service 120 can support many additional enterprises 110 beyond the three non-limiting examples. The data transfer between the information delivery service 120, communications manager server 122 and the enterprises 110 includes, but is not limited to, data formats such as a printer control file, PDF, XML, database, CVS, TXT, XLS, HTML, DOC and RTF. It is assumed that each of the enterprises 110 has the necessary computing hardware (not shown) to process the communications. An account manager 115 with a computer terminal is included in the enterprise group since any one of the enterprises may choose to have an online person to communicate with a customer 150 by using the information delivery service 120 resources to support email, live chat or mobile phone texting. Other forms of account manager 115 communications options may be utilized as recognized by those of ordinary skill in the art.

The information delivery service 120 is the processing center for the enterprise 110 communications to the customers 150 via the selected delivery channels 130. The communications manager 122 is a server or other computer architecture as configured by those skilled in the art. FIGS. 5 and 6 provide additional computing system description. An operator display, key board and mouse (not shown) will be included as required for IT personnel and for customer service/account representatives 115. Communication format conversion algorithms needed to send messages over different delivery channels 130 are executed in the communications manager 122. Extensive data records are maintained by the communications manager 122. The mobile phone number and account number directory 124 contains the demographic data and enterprise account data for each customer 150 where all entries are referenced to the customer's mobile phone number as shown in the following example. An exemplary customer with a mobile number of 202-555-1234 has several accounts with the following enterprises: ABC Dept. store, Acct. No. 12345; DEF Bank, Acct. No. 34567; and GHI Utility, Acct. No. 888765.

Delivery preferences 123 data files are stored in the delivery preferences directory 123. This directory defines what types of data will be transmitted over which delivery channel 130 for each enterprise 110 that the customer 150 has enrolled with for communication delivery. All customer delivery preferences are referenced to the customer's mobile phone number. A customer may specify numerous locations such as but not limited to a primary residence, a second home, vacation location and frequent business travel locations. Each location may have different delivery channel 130 requirements due to channel availability. A date range can be assigned for each location so that automatic delivery changes can be made. If the delivery change is a short duration, the customer 150 may want delayed delivery for formats such as print, while messages suitable for a mobile device are delivered. Since the customer's data is referenced to a mobile phone number, the location changes do not affect the data structure.

The communications content and archive directory 125 stores the communications content that is transmitted to the information delivery service 120, for distribution, from the enterprise 110. Depending on the complexity of the data conversion, the channel specific data will be converted as the message is sent or converted in advance and stored. Reference to the customers 150 by way of their mobile phone number enables all the customers 150 slated to receive the same message over the same delivery channel 130, to retrieve one copy of the formatted message from the content directory 125 and transmit that message over a specific delivery channel. Only one copy of the communication needs to be saved since the mobile phone number is unique to each customer 150 and is used to locate the correct message data, however multiple copies can be saved if desired. A record of the communication transmission, referenced to the customers 150 mobile phone number, is stored in the communications content and archive directory 125. Queries of the archived communications data can be accessed by the customer representative (account manager) 115 with only the mobile phone number as a reference. The directory data structure presented with Delivery Preferences 123, Customer Data 124 and Communications, Content and Archive 125 may imply three separate data structures, each on its own hard drive. However, this data structure is exemplary in nature since the data defined for the three directories can be implemented in a large variety for formats such as but not limited to, a single large file, separate files, organized in different architecture and stored in one or more hard drives or memory.

As an option, for the case where the enterprise communications is to a large customer group, located over a large geographic area, a distributed number of regional information delivery services 120a and communication manager processors 122 may be networked together in order to reduce the bandwidth needed for distribution of the message. The networking is particularly effective when the enterprise(s) 110 provides to the information delivery service 120 the customer list, delivery channel 130 selections and message content in advance of the date that the message is due to be distributed. In this case all of the data conversions can be completed and distributed over the network to other regional information delivery services 120a, as required, at a lower bandwidth and with none of the communication managers 122 having to perform real time data message formatting, or experience heavy CPU loading.

The regional information delivery service(s) 120a enables the communications manager 122 to change content of the marketing data based on geographic data without overloading the system processors. For example, a store discount coupon may have varying amounts of discount based on the distance from the store, or the expiration data may be later to give the person more time to plan a drive to the store. Other non-limiting examples include sports ticket cost and amusement park cost. If the information delivery service 120 processor 122 has sufficient computing power and network bandwidth, the distributed proceeding is not needed.

Turning now to the delivery channels 130 for a description of the examples that are illustrated. The features described for each delivery channel 130 will change with technology evolution. However the unique customer electronic reference number (mobile phone number) of this disclosure remains applicable as the delivery channels evolve. For example, another mobile device with a unique customer electronic reference number may replace the mobile phone number in the future. The delivery channel for print 132 is conventional mail that would be prepared by a letter shop or service bureau. The email channel 133 sends a message in normal HTML or plain text formats to a personal computer (PC), smart phone or tablet. Similarly a web site 134 can be used with a variety of data formats and a large variety of attachment types to communicate with the customer. The web site access can be hosted on smart phones, PCs and tablets as long as internet connectivity is available. Modern flat panel televisions 135 have Wi-Fi capability for internet access. Therefore, email account data and web site access is available for the customers use on their TV 135 or other multimedia connections. Granted, the virtual keyboard and mouse are not easy to use, but wireless alternatives will evolve. The cable or satellite service providers can offer dedicated TV channels for delivery of messages from the selected enterprises 110, plus they can superimpose alerts and crawler messages to any channel as indicated by the caller ID messages that are currently common. As stated earlier, the customer 150 defines the delivery channel(s) 130 to use and the message type that is acceptable over the channel. The TV 135 channel is a prime example of where customization is needed. Such customization features include but are not limited to black out times, frequency of messages, content of critical alerts, blackout dates due to unavailability such as vacation and spam control. The TV 135 option also has the ability to report if the message was received since the cable box can recognize the status of the TV (on or off) and can report the status over the cable and similarly the satellite box can report the same status over the attached phone line.

One of the most rapidly expanding areas is the social media 136 delivery channels. The social media channel 136 in FIG. 1 shows some of the icons for social media such as Facebook, Twitter, LinkedIn, Google and YouTube to list some of the most well-known. Both the variety of social media channels and the content they can delivery will continue to evolve which ensures that the information delivery service 120 will be able to offer communication content and format that meets the customer's 150 needs.

The mobile smart phone 137 channel offers numerous delivery channels for message access with text messages 139, voice mail, email alert apps, web and email access. These capabilities will continue to expand and the information delivery service 120 will expand services as required. Competing delivery services (consolidators 138) are part of the delivery network available for getting messages to customers 150 of an enterprise which is not signed up with the information delivery service 120. As described above, other delivery channels 140 will be integrated with the information delivery service 120 as they become available.

Figure 2:
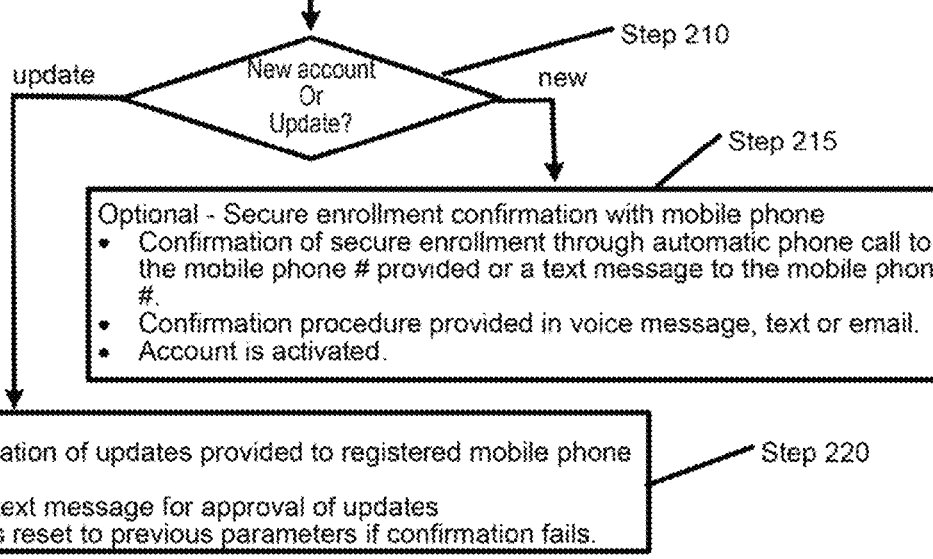
FIG. 2 is an exemplary block diagram of the steps required for a customer or an enterprise to join an information delivery service.
Figure 3:
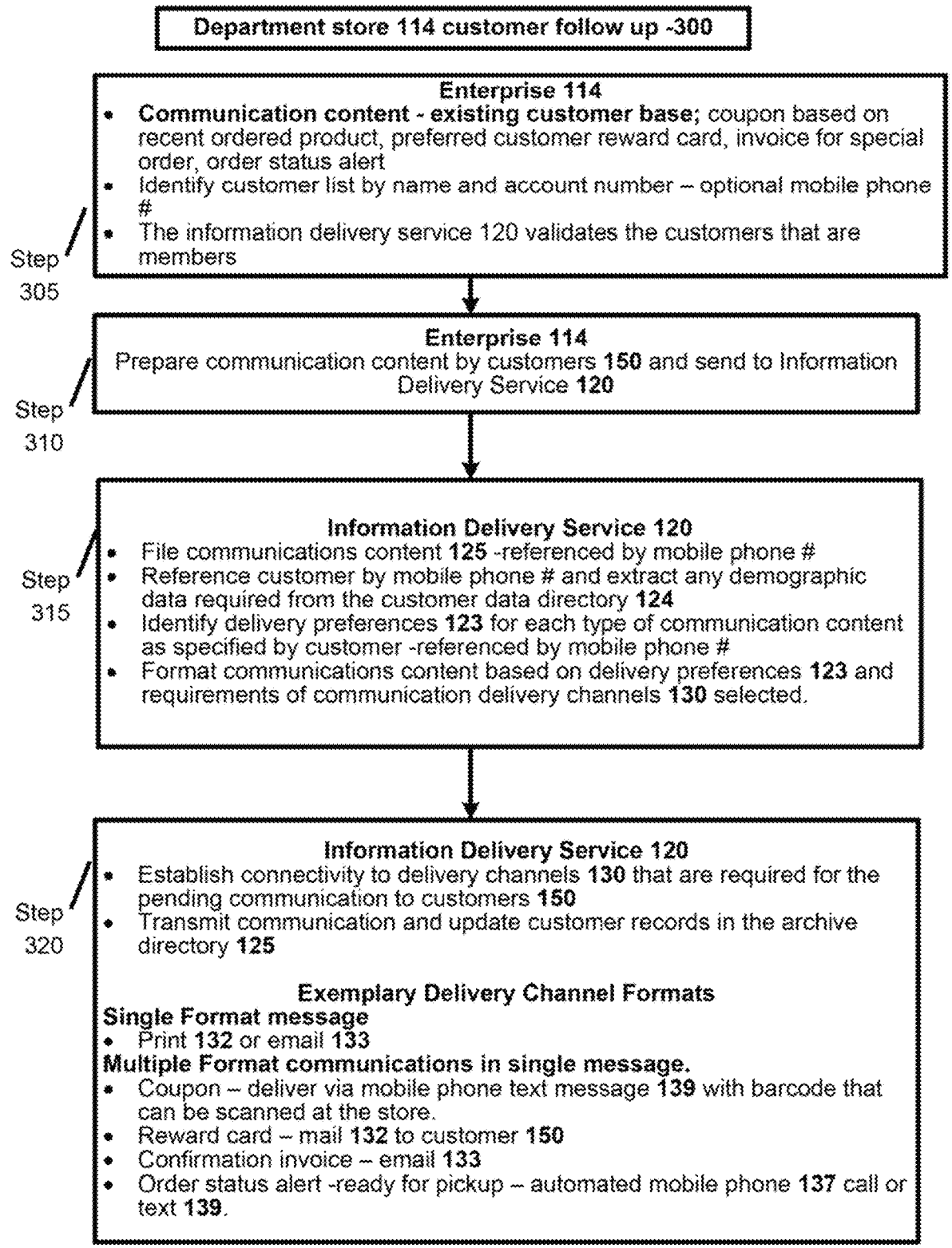
FIG. 3 is an exemplary block diagram of the steps required for store to send a multi-faceted communications to a customer via the information delivery service.
Figure 4:
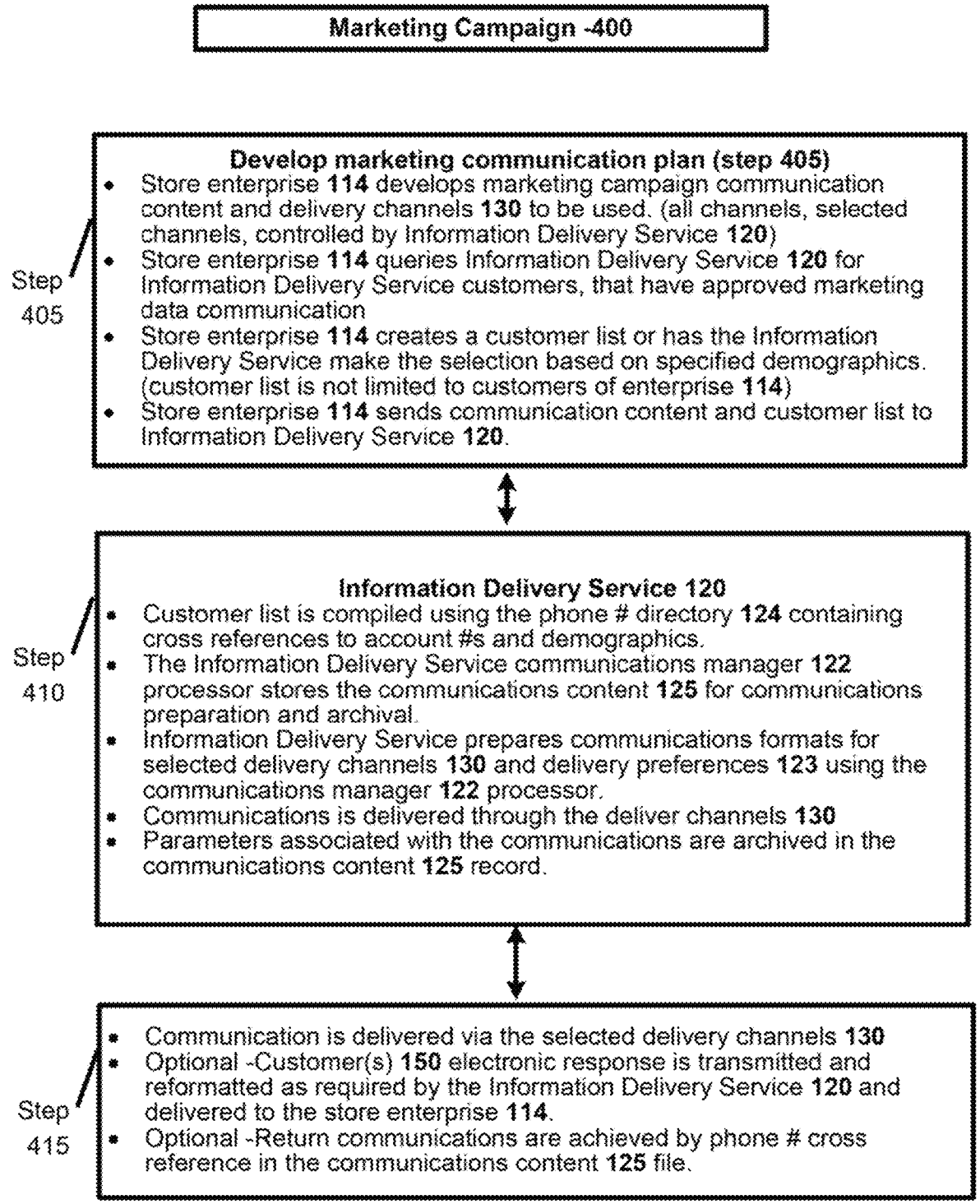
FIG. 4 is an exemplary block diagram of the steps required for a marketing campaign via the information delivery service.

Attention is now directed to FIGS. 2, 3 and 4 for examples of: the enrollment process for a customer 150 and for an enterprise 110; the process steps for an enterprise 114 delivering a message to an existing customer 150; and of the process steps for enterprise 114 delivering marketing information to a broad range of recipients 150, respectively. Starting with FIG. 2, step 200, involves the review of the customer enrollment process with the information delivery service 120 to become an enrolled member. Step 205 illustrates several items in the enrollment process that are exemplary of the process but are not inclusive of all the possible items that are available for one skilled in the art to include in a customer enrollment process to build a more in-depth profile and metadata files. In Item 1 of step 205, the customer contacts the information delivery service 120 by electronic means which includes but is not limited to a mobile device, computer interface, a tablet interface via network connection to a web site for the delivery service or as a backup, non-electronic mail or a phone call if so desired. A preferred enrollment access would be a web site, accessed by an internet enabled device. However, talking to a representative or filling out a form are some of the other options that may be offered. Item 2 initiates the data entry process by registering the customer's mobile phone number. The mobile phone number is entered first since all other account data is referenced to the mobile phone number. Next the customer 150 selects the enterprises 110 from the information delivery service 120 list of member enterprises (Item 3). These enterprises can be enterprises that the customer 150 already does business with and wants to use the information delivery service 120 as the communication link to the enterprise 110 or enterprises 110 the customer envisions doing business with. Item 4 is a sample of account data for enterprises (112, 113, 114) linked to the customer mobile phone number. A customer with a mobile number of 202-555-1234 has several accounts with the following enterprises: ABC Dept. store, Acct. No. 12345; DEF Bank, Acct. No. 34567; and GHI Utility, Acct. No. 888765.

As an option (Item 5), the customer may authorize receiving marketing communication from a select group of enterprises (112, 113, 114) or from all member enterprises 110. The customer 150 is given controls, filters and general spam restrictions so that unwanted marketing data can be blocked. Once the customer has selected the enterprises 110, the delivery channels 130 that the customer wants to use to receive different types of messages, are selected (item 6 step 205). FIG. 3, step 320 provides an exemplary example of a message from an enterprise 114 being divided into different formats for delivery. The example includes but is not limited to a coupon, a reward card, an email and a phone alert text or call. In item 7, the customer enters demographic data such as but not limited to name, address, email address, product and services preferences, social media 136 links and access, personal web page link and access and alert preferences from financial institutions and retail stores. The information delivery service 120 may offer customers 150 a web site log on to as an option with USERID and password for enrollment and data updates, item 8. Numerous additional data entry items in addition to items 1 to 8 can be entered to further refine the communication process based on design alternatives that are desired.

Continuing with step 210, the customer has two security options. One option for enrollment, step 215, and another for data updates, step 220, are illustrated. For a new enrollment, step 215, confirmation of the enrollment is accomplished with an automatic call, voice mail or text to the mobile phone number or an email that can be accessed from the mobile phone. The account is activated with a return text, web site logon response or an email response. As an option, updates to the account, step 220, can be validated with an automatic call, voice mail or text to the registered mobile phone number and validated with a return text, web site logon response or an email response. The disclosures in steps 200 through 220 are abbreviated examples of each process. It should be understood that the content and complexity of each step can be expanded as dictated by the features which are offered to the customers 150 and to the enterprises 110 by the information delivery service 120, plus the features available from the delivery channels 130.

The enterprise 110 must enroll with the information delivery service 120 (step 250) to specify the message delivery 130 options they want to use. The number of features selected will affect the cost of the information delivery service 120 for services utilized. The enterprise 110 must specify the structure of their communications to customers 150 in terms of the subcategories of the planned communications and which delivery channels 130 can be used to deliver each subcategory. For example, the message may be a combination of a bill, a statement, a document, a notification, an alert, a coupon, solicitation for goods or services, a personal note or a short message. The enterprise also selects the delivery channel 130 preferences that must be supported for each subcategory of their planned messages. In many cases the enterprise will select all delivery channels 130 so that all delivery channel 130 options are supported and available for customer selection. The enterprise provides a customer list, associated with a planned communication, having at least a name, address and account number, to the information delivery service 120. If available to the enterprise, the mobile phone number will be included in the customer list. If the mobile phone number is not available, the linkage to the mobile phone number will be provided when the customer enrolls in the delivery service. The information delivery service 120 will return to the enterprise 110 the customer list with identification of those customers that are not enrolled in the information delivery service 120. Either the enterprise 110 or the information delivery service 120 will notify the missing customers to enroll in the information delivery service 120. Customers that are not enrolled will receive the communication via a default channel which is likely to be by mail 132. Many enterprises offer customers that have a web access account with the customer, the option to go paperless. If the enterprise is enrolled in the delivery service, the customer would be offered to enroll in the delivery service and thereby enable the full variety of paperless options offered by the delivery service.

Turning now to FIG. 3 that is an exemplary block diagram of the steps required for store 114 to send a multi-faceted communication to a customer(s) 150 via the information delivery service 120. The exemplary message chosen is based on a follow-up to a group of customers that recently ordered products, step 300. In step 305 the enterprise 114 sends a message with subcategories including a coupon based on a recently ordered product, preferred customer reward card, invoice for special order, order status alert. The enterprise 114 generates the customer list with a name, address, account number and mobile phone number as an option. The enterprise provides the customer list, associated with a planned communication, which has at least a name, address and account number, to the information delivery service 120. If available to the enterprise, the mobile phone number will be included in the customer list. The information delivery service 120 will return to the enterprise 110 the customer list with identification of those customers that are not enrolled in the information delivery service 120. In the next step 310, the enterprise 114 prepares the unique communication content by customer and sends the customer list and communications content to the information delivery service 120. As defined in step 315, the information delivery service 120 will receive the communications content, add the mobile phone number reference and file the data in the communication content directory 125. The information delivery service 120 will extract any demographic data from the customer metadata directory 124, which is needed to format the message. The customer 150 delivery preferences, stored in the delivery preference directory 123, are retrieved by the customer 150 using their mobile phone number. The delivery preferences are used by the information delivery service 120 along with the subcategories of the message content to reformat the message to be compatible with the customer selected delivery channel 130 format requirements for each message subcategory. In order to send all the message subcategories, the information delivery service 120 establishes connectivity with each required delivery channel and transmits the complete message as defined in step 320. The metadata about the communication, including for example, such as, the time sent, channels used, delivery conformation, actions taken by the customer and product pick up or delivery confirmation, are added to the archive data directory 125.

Step 320 of FIG. 3 contains two examples of message types, the first with no subcategories and the second with 4 subcategories. Neither example is intended to be considered as a representation of a complete set of possible communication formats that will be used by those skilled in the art. The simple message may be sent in its entirety by print and mailed 132 or by email 133. The second example includes a coupon, a customer reward card, a confirmation that the order was processed plus an invoice and an alert that the order is ready for pickup. Based on customer preferences 123 and enterprise 110 requirements, the coupon will be delivered by a mobile phone text message 139. When the coupon is displayed on the mobile phone, a barcode scanner will be able to decode the coupon value. The reward card will be mailed 132 and the confirmation invoice will be sent by email 133. The order status, ready for pickup, will be sent by an automated call to the mobile phone 137 or by a text message 139.

The information delivery service 120 also is used to facilitate a marketing campaign 400, as exemplified in FIG. 4. Step 405 provides an example of the steps that ABC Department store 114 needs to perform to initiate a marketing communication to its customers and to other members of the information delivery service 120 who have approved the receipt of marketing communications. The store 114 develops the marketing campaign communications content and specifies the delivery channels 130 to be used. The selection of delivery channels 130 may include all channels, provided that all the channels are capable of transmitting the message. The store 114 may select a subset of the delivery channels 130 based on the store's 114 desire to present their communications in a specific format. The store 114 queries the information delivery service 120 to receive a list of information delivery service 120 customers and their applicable demographic data that have approved receiving marketing data. The store 114 generates a customer list for their marketing campaign. Alternately, the store 114 may send a definition of the customers, based on demographics of who should be included in the campaign, to the information delivery service 120 for the information delivery service 120 to develop the customer list. The list will include store 114 customers and other customers that are members of the information delivery service 120. If the customer list is propriety or restricted to the information delivery service 120, the customer list will not be shared with the enterprise. The store 114 sends the marketing communication content and customer list to the information delivery service 120 where it is stored in the communications directory 125.

Attention is now turned now to step 410 in FIG. 4, for an illustration of the information delivery service 120 processing steps. The communication manager processor 122 compiles the customer list using the mobile phone number directory 124 data to cross reference each customer to store account numbers, demographics and delivery channel 130 preferences. The marketing communications is reformatted based on the delivery channel preferences 123 and stored in the communication content directory 125 by the communications manager processor 122. The marketing communications is delivered to the opened delivery channels 130 that are selected and transmitted to the customers 150. Parameters associated with the communications are achieved in the archive section of the communications content directory 125, for future review, via the communications manager processor 122 and the account manager 115.

As part of step 415, the marketing communications is delivered by the selected delivery channels 130. The customer 150 has the option responding via an electronic two way delivery channel 130 that is part of the information delivery service 120 network. The return communication, to the store 114, can occur via, but not limited to, email 133, Web site access 134, mobile phone 137 and text 139. As an option, the delivery confirmation and return communications information can be archived, by the mobile phone number reference, in the communications content directory 125. The return information needs to occur via the information delivery service 120 network so that the data is available to the communications manager 122 for archival processing.

As shown by the above discussion, functions relating pertain to the operation of an information delivery service 120 which is implemented in hardware (communications manager 122) and interfaced to one or more computers operating as part of each deliver channel 130 as shown in FIG. 1. The information delivery service 120 collects and delivers communications data from the enterprises 110 and delivers the communications data to the delivery channels 130 for delivery to the customer 150. These processes are controlled and data formatted by the communications manager processor 122. The communication manager 122 uses a variety of stored data files to process the communications. The exemplary stored data files, phone number—Account number 124; communications content 125 and delivery preferences 123, will be formatted by those skilled in the art and stored in storage devices in accordance with the design requirements of those skilled in the art. These three data files are for example only and are not intended as a design limitation. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer that functions as the control processor 170 and/or the associated terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for tracking of mail items through a postal authority network with reference to a specific mail target, in essentially the manner performed in the implementations discussed and illustrated herein.

FIGS. 5 and 6 provide functional block diagram illustrations of general purpose computer hardware platforms. FIG. 5 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that those skilled in the art are familiar with the structure, programming and general operation of such computer equipment and, as a result, the drawings should be self-explanatory.

For example, the communications manager 122 may be a PC based implementation like that of FIG. 6, or may be implemented on a platform configured as a central or host computer or server like that of FIG. 5. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for tracking of mail items through a postal authority network with reference to a specific mail target, as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as a "program article of manufacture" may take the form of code or executable instructions for causing a computer or other programmable equipment to perform the relevant data processing steps, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for electronically recording data of a recipient by an information delivery service to format and deliver communications to the recipient, the method comprising:
    receiving and storing recipient data in a database by way of a programmed computer, wherein the recipient data includes different types of enterprise account numbers of the recipient;
    electronically enrolling the recipient data into an information delivery service database;
    receiving a recipient selection of enterprises about which the information delivery service is authorized to send the communications to the recipient;
    identifying preferred delivery channels for delivery of the communications; and
    associating the recipient data with a mobile phone number of the recipient, such that a mobile phone associated with the mobile phone number permits access to location data of the recipient,
    wherein communications content is varied based on a distance between one of the enterprises and the recipient,
    wherein the mobile phone returns the location data on a real-time basis to the information delivery service for calculating the distance between the enterprise and the recipient, and
    wherein each communication is selected from one or more of a coupon delivered by way of a mobile phone text message including a barcode to be scanned at the enterprise, a reward card, physical mail to the recipient, a confirmation invoice by way of an email, an order status alert, and an automated mobile phone call or text.

2. The method of claim 1, wherein electronically enrolling is performed by one of: a mobile device, computer interface, or tablet interface via network connection to a web site for the delivery service.

3. The method of claim 1, wherein the preferred delivery channels for the communications are dependent upon content of the communications.

4. The method of claim 1, wherein the recipient data includes at least one of recipient preferred delivery channels, geographic data, marketing data authorization, specified black out times, frequency of messages, content of critical alerts, blackout dates due to unavailability, and spam control.

5. The method of claim 1, wherein the delivery channels include at least one of: e-mail, web site access, network connected television, social media, mobile smart phone, text message or a consolidator.

6. The method of claim 1, wherein confirmation of the recipient data is forwarded to the mobile phone number of the recipient.

7. A method of transmitting one or more communications, the one or more communications pertaining to an enterprise, from an information delivery service to at least one recipient, the method comprising:
    receiving communication content and instructions from the enterprise at a communication manager computer of the information delivery service and storing the communication content and instructions in a database referenced to a mobile phone number of the recipient;
    transmitting real-time location data from a mobile phone, which is associated with the mobile phone number of the recipient, to the information delivery service;
    identifying delivery preferences for each type of communication content as specified by the recipient, referenced by the mobile phone number;

formatting communication content based on the delivery preferences identified and requirements of one or more communication delivery channels;

calculating, at the information delivery service, a distance between the recipient and the enterprise by comparing the location data of the recipient against the physical location of the enterprise;

using the location data of the recipient to vary the communication content based on a distance measured between the recipient and the enterprise;

establishing connectivity to the one or more delivery channels that are required for each pending communication to the recipient; and transmitting each communication to an associated delivery channel, wherein each communication is selected from one or more of a coupon delivered by way of a mobile phone text message including a barcode to be scanned at the enterprise, a reward card, physical mail to the recipient, a confirmation invoice by way of an email, an order status alert, and an automated mobile phone call or text.

8. The method of claim 7, wherein a record of each transmitted communication is archived in an archive directory by the mobile phone number of the recipient.

9. The method of claim 7, further comprising:
referencing metadata of the recipient by the mobile phone number in a metadata directory; and
extracting any demographic data required from the metadata directory or from an archive directory.

10. The method of claim 9, wherein the demographic metadata is selected from at least one of:
a recipient location, recent transaction with the enterprise, specified black out times, frequency of messages, content of critical alerts, blackout dates due to unavailability or spam control.

11. The method of claim 7, wherein a plurality of delivery channels and contents are required for a communication to the recipient.

12. A method of executing a marketing communication for an enterprise to target, using an information delivery service, a plurality of recipients through delivery channels, the method comprising:
developing, at the information delivery service, a recipient list comprising recipients that approve receiving marketing communications from the enterprise;
associating demographic data with each recipient to establish a marketing communications plan;
receiving, at the information delivery service, enterprise communication requirement data and storing the data in at least one database of the information delivery service;
associating the recipient list with respective mobile phone numbers of each recipient to reference entries in the database;
transmitting location data of each recipient from a mobile phone associated with the respective mobile phone numbers to the information delivery service; and
transmitting the communications to the respective recipients by way of the delivery channels,
wherein communications content is varied based on a distance between one of the enterprises and the recipient,
wherein the mobile phone returns the location data on a real-time basis to the information delivery service for calculating the distance between the enterprise and the recipient, and
wherein the communication is selected from one or more of a coupon delivered by way of a mobile phone text message including a barcode to be scanned at the enterprise, a reward card, physical mail to the recipient, a confirmation invoice by way of an email, an order status alert, and an automated mobile phone call or text.

13. The method of claim 12, wherein the demographic data includes at least one of:
recipient preferred delivery channels, geographic data, marketing data authorization, specified black out times, frequency of messages, content of critical alerts, blackout dates due to unavailability and spam control.

14. The method of claim 13, wherein upon transmission of each communication, an electronic response is transmitted back to the information delivery service through the delivery channel and forwarded to the enterprise.

15. The method of claim 14, wherein parameters associated with the communications are archived and referenced to the mobile phone number in communications content record.

16. An electronic communication system for transmitting one or more communications regarding an enterprise to at least one recipient using an information delivery service, the system comprising:
a communication manager computer of the information delivery service, the communication manager computer comprising at least one processor for executing executable code, wherein the communication manager computer is configured to receive communication content and instructions from the enterprise and to store the communication content and instructions in a database referenced to a mobile phone number of the recipient;
a delivery preference database comprising at least one non-transitory computer readable medium, wherein the delivery preference database is configured to store delivery preferences for each type of communication content as specified by the recipient, referenced by the mobile phone number, wherein the delivery preference database or another database is configured to associate recipient data with a mobile phone number of the recipient, such that a mobile phone associated with the mobile phone number permits access to location data of the recipient; and
a communication server comprising at least one processor for executing executable code, wherein the communication server is configured to:
format communication content based on the delivery preferences and requirements of one or more communication delivery channels;
establish connectivity to the one or more delivery channels that are required for each pending communication to the recipient; and
transmit each communication to an associated delivery channel,
wherein communications content is varied based on a distance between one of the enterprises and the recipient,
wherein the mobile phone returns the location data on a real-time basis to the information delivery service for calculating the distance between the enterprise and the recipient, and
wherein the communication is selected from one or more of a coupon delivered by way of a mobile phone text message including a barcode to be scanned at the enterprise, a reward card, physical mail to the recipient, a confirmation invoice by way of an email, an order status alert, and an automated mobile phone call or text.

17. The system of claim 16, wherein the delivery channel includes at least one of: e-mail, web site access, network connected television, social media, mobile smart phone, text message or a consolidator.

18. The system of claim 16, wherein the communication is selected from one or more of:
a coupon delivered by way of a mobile phone text message including a barcode to be scanned at the enterprise; a reward card; physical mail to the recipient; a confirmation invoice by way of an email; an order status alert; an automated mobile phone call or text.

19. A method for electronically recording data of a recipient by an information delivery service to format and deliver communications to the recipient, the method comprising:
receiving and storing recipient data in a database by way of a programmed computer, wherein the recipient data includes delivery preferences for each type of communication content receivable by recipient;
electronically enrolling the recipient data into an information delivery service database;
receiving, at the information delivery service, a recipient selection of enterprises about which the information delivery service is authorized to send the communications to the recipient;
identifying preferred delivery channels for delivery of the communications; and
associating the recipient data with a mobile phone number of the recipient, such that a mobile phone associated with the mobile phone number permits access to location data of the recipient,
wherein communications content is varied based on a distance between one of the enterprises and the recipient,
wherein the mobile phone returns the location data on a real-time basis to the information delivery service for calculating the distance between the enterprise and the recipient, and
wherein each communication is selected from one or more of a coupon delivered by way of a mobile phone text message including a barcode to be scanned at the enterprise, a reward card, physical mail to the recipient, a confirmation invoice by way of an email, an order status alert, and an automated mobile phone call or text.

20. A method of transmitting one or more communications, the one or more communications pertaining to an enterprise, from an information delivery service to at least one recipient, the method comprising:
receiving communication content and instructions from the enterprise at a communication manager computer of the information delivery service and storing the communication content and instructions in a database referenced to a mobile phone number of the recipient;
identifying delivery preferences for each type of communication content as specified by the recipient, referenced by the mobile phone number;
formatting communication content based on the delivery preferences identified and requirements of one or more communication delivery channels;
establishing connectivity to the one or more delivery channels that are required for each pending communication to the recipient; and
transmitting each communication to the associated delivery channel,
wherein communications content is varied based on a distance between one of the enterprises and the recipient,
wherein the mobile phone returns the location data on a real-time basis to the information delivery service for calculating the distance between the enterprise and the recipient, and
wherein each communication is selected from one or more of a coupon delivered by way of a mobile phone text message including a barcode to be scanned at the enterprise, a reward card, physical mail to the recipient, a confirmation invoice by way of an email, an order status alert, and an automated mobile phone call or text.

21. A method of sending a marketing communication pertaining to an enterprise from an information delivery service to target a plurality of recipients through delivery channels, the method comprising:
developing a list of the recipients to receive marketing communications about the enterprise, and associating demographic data with each recipient to establish a marketing communications plan;
receiving enterprise communication requirement data and storing the data in at least one database of the information delivery service;
associating the recipient list with respective mobile phone numbers of each recipient to reference entries in the database, wherein a reference entry in the database includes delivery preferences for each type of communication content receivable by the recipient, and wherein a mobile phone mobile phone associated with the mobile phone number permits access to location data of the recipient; and
transmitting the communications to the respective recipients by way of the delivery channels,
wherein communications content is varied based on a distance between one of the enterprises and the recipient,
wherein the mobile phone returns the location data on a real-time basis to the information delivery service for calculating the distance between the enterprise and the recipient, and
wherein each communication is selected from one or more of a coupon delivered by way of a mobile phone text message including a barcode to be scanned at the enterprise, a reward card, physical mail to the recipient, a confirmation invoice by way of an email, an order status alert, and an automated mobile phone call or text.

22. An electronic communication system for transmitting one or more communications regarding an enterprise to at least one recipient using an information delivery service, the system comprising:
a communication manager computer of the information delivery service, the communication manager computer being configured to receive communication content and instructions from the enterprise and to store the communication content and instructions in a database referenced to a mobile phone number of the recipient;
a delivery preference database configured to store delivery preferences for each type of communication content as specified by the recipient, referenced by the mobile phone number, wherein at least one of the delivery preferences permits access to location data of the recipient sent from a mobile phone associated with the mobile phone number; and
a communication server configured to:
format communication content based on the delivery preferences and requirements of one or more communication delivery channels;

establish connectivity to the one or more delivery channels that are required for each pending communication to the recipient; and transmit each communication to the associated delivery channel, wherein communications content is varied based on a distance between one of the enterprises and the recipient, wherein the mobile phone returns the location data on a real-time basis to the information delivery service for calculating the distance between the enterprise and the recipient, and wherein the communication is selected from one or more of a coupon delivered by way of a mobile phone text message including a barcode to be scanned at the enterprise, a reward card, physical mail to the recipient, a confirmation invoice by way of an email, an order status alert, and an automated mobile phone call or text.

* * * * *